United States Patent [19]

Peng

[11] Patent Number: 5,439,163

[45] Date of Patent: Aug. 8, 1995

[54] METHOD OF JOINING TWO ALUMINUM TUBULAR MEMBERS

[76] Inventor: Jung-Ching Peng, P.O. Box 82-144, Taipei, Taiwan

[21] Appl. No.: 181,315

[22] Filed: Jan. 13, 1994

[51] Int. Cl.$^6$ ............................................. B23K 31/02
[52] U.S. Cl. ........................... 228/189; 228/196; 228/234.1; 228/262.44; 228/51
[58] Field of Search .............. 228/126, 135, 138, 189, 228/196, 234.1, 262.44, 51, 55; 219/229

[56] References Cited

U.S. PATENT DOCUMENTS

| | | | |
|---|---|---|---|
| 4,205,221 | 5/1980 | Meyer | 228/55 |
| 5,234,378 | 8/1993 | Helgesen et al. | 464/180 |

FOREIGN PATENT DOCUMENTS 44538  4/1976  Japan ......................... 228/189

*Primary Examiner*—Samuel M. Heinrich
*Attorney, Agent, or Firm*—Alfred Lei

[57] ABSTRACT

A method of joining two aluminum tubular members comprising steps of: inserting a iron ring member into a first aluminum tubular member, with part of the iron ring member extending out of the first aluminum tubular member; put a second aluminum tubular member on to the part of the iron ring member extending out of the aluminum tubular member; heating a pair of molds having a less width than the iron ring member to a temperature of 660 degrees centigrade; and applying the molds on the place where the two aluminum tubular members are joined together so as to melt the two aluminum tubular members together.

1 Claim, 4 Drawing Sheets

METHOD OF JOINING TWO ALUMINUM TUBULAR MEMBERS

BACKGROUND OF THE INVENTION

It has been found that the prior art methods of connecting two aluminum pipes are simply achieved by welding (see FIGS. 4 and 5), screwing, gluing, or press-fitting. However, none of the above-mentioned methods can firmly and rapidly join two pipes together.

Therefore, it is an object of the present invention to provide an improved method of joining two aluminum tubular members which may obviate and mitigate the above-mentioned drawbacks.

SUMMARY OF THE INVENTION

This invention relates to an improved method of joining two aluminum tubular members together.

It is the primary object of the present invention to provide a method of joining two aluminum tubular members which can join the aluminum tubular members firmly together.

It is another object of the present invention to provide a method of joining two aluminum tubular members which can rapidly connect two aluminum tubular members together.

It is still another object of the present invention to provide a method of joining two aluminum tubular members which can be easily performed by automatic machines.

It is still another object of the present invention to provide a method of joining two aluminum tubular members which is practical in use.

It is a further object of the present invention to provide a method of joining two aluminum tubular members which is fit for mass production.

Other objects and merits and a fuller understanding of the present invention will be obtained by those having ordinary skill in the art when the following detailed description of the preferred embodiment is read in conjunction with the accompanying drawings wherein like numerals refer to like or similar parts.

DETAILED DESCRIPTION OF THE PREFERRED EMBODIMENT

Figure 1:
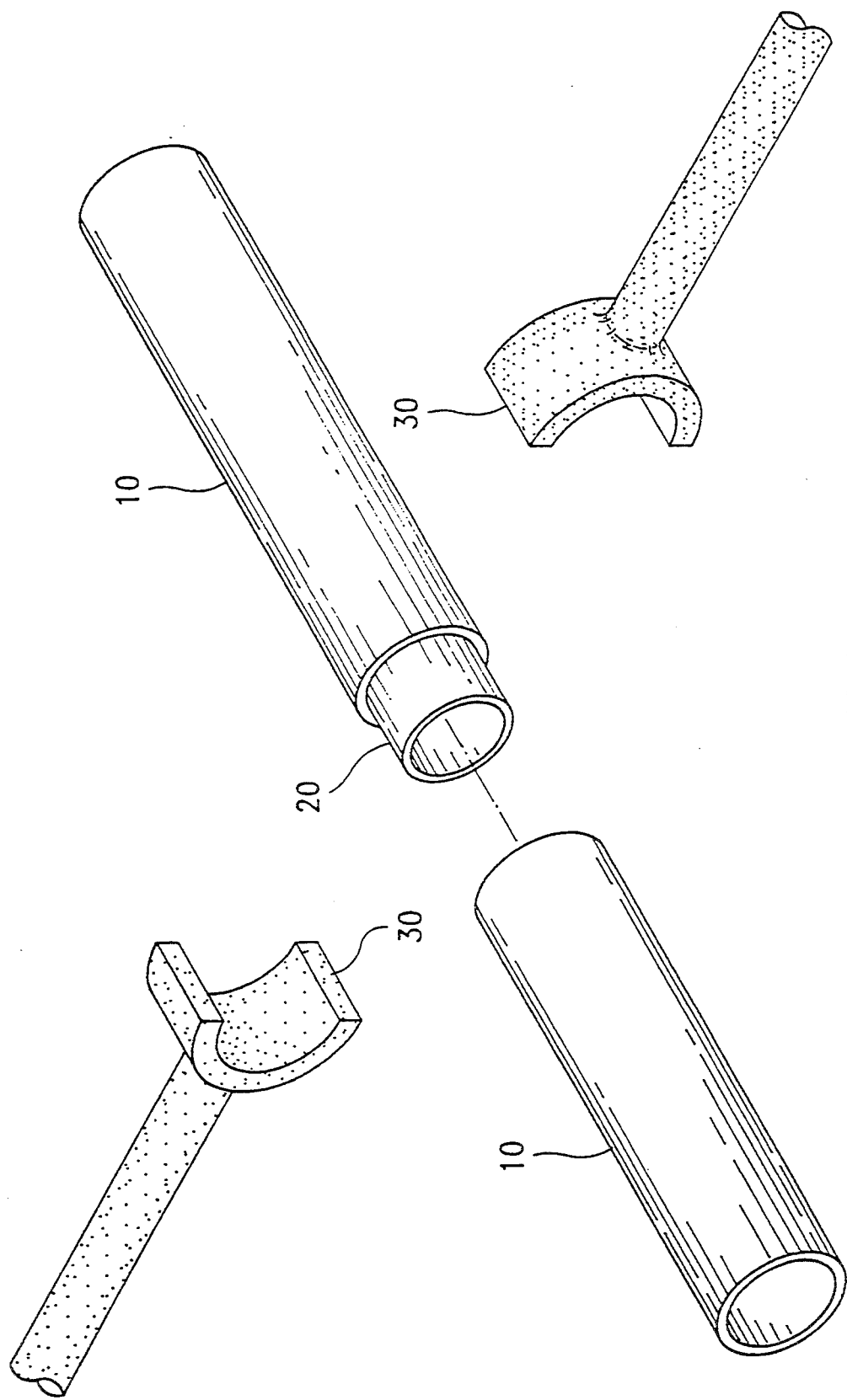
FIG. 1 shows the method of connecting two aluminum tubular members according to the present invention.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
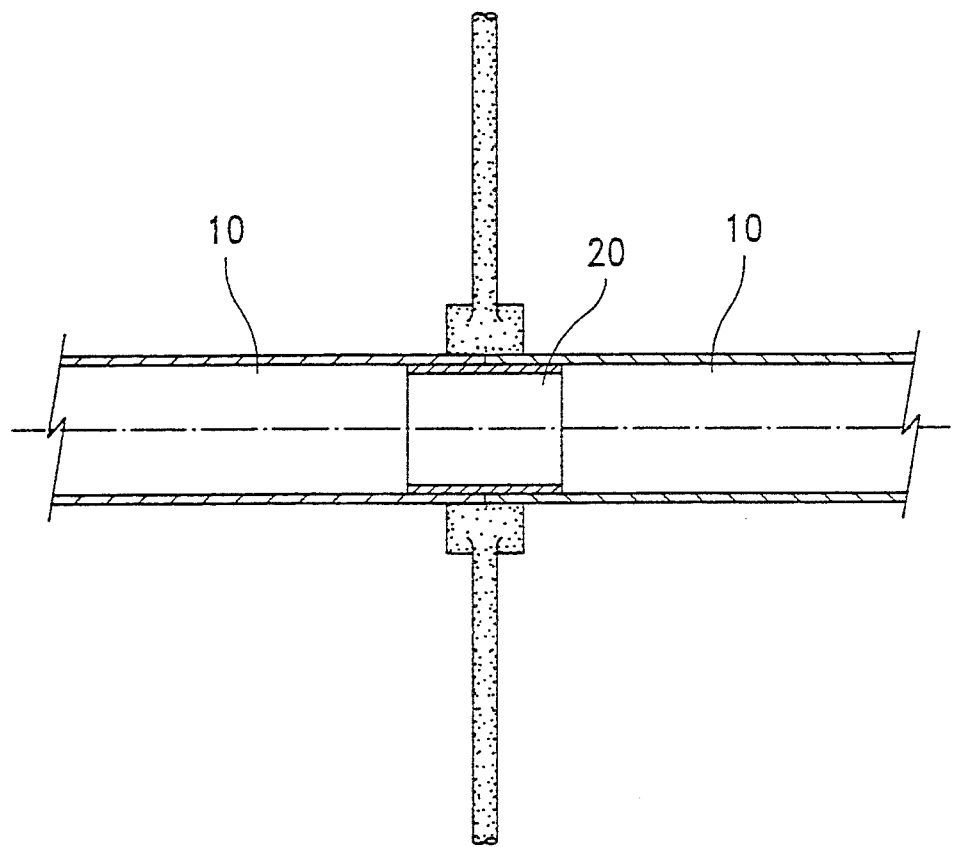
FIG. 2 is a working view of the present invention.
Figure 3:
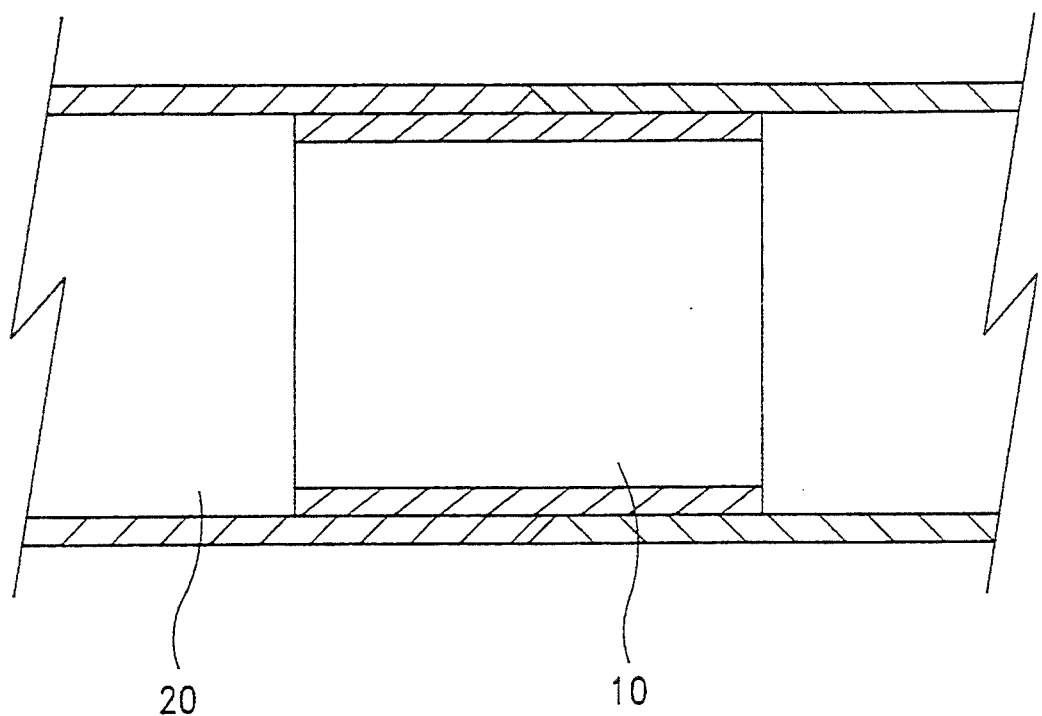
FIG. 3 is a sectional view showing two aluminum tubular members joined together by the method according to the present invention.
Figure 4:
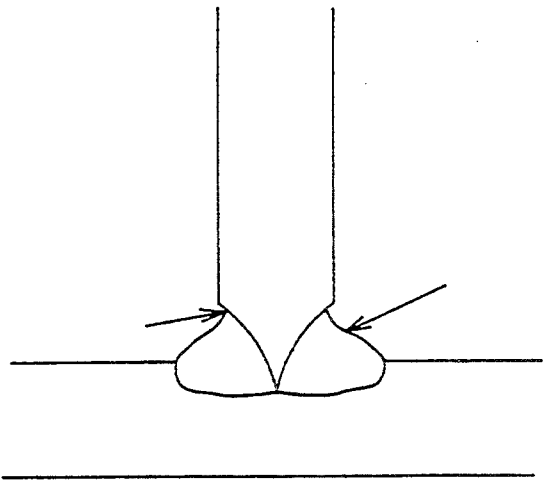
FIG. 4 shows a first prior art method to connect two aluminum tubular members.
Figure 5:
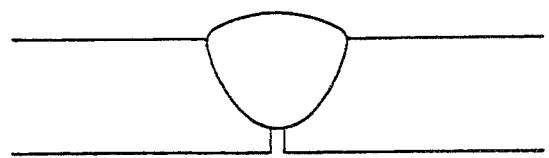
FIG. 5 shows a second prior art method to connect two aluminum tubular members together.

With reference to the drawings and in particular to FIGS. 1, 2 and 3 thereof, the method of connecting two aluminum tubular members according to the present invention comprises steps of:

1. insert a iron ring member 2 into a first aluminum tubular member 10, with part of the iron ring member 2 extending out of the first aluminum tubular member 10;
2. put a second aluminum tubular member 10 on to the part of the iron ring member 20 extending out of the aluminum tubular member 10;
3. heating a pair of molds 30 having a less width than the iron ring member 2 to a temperature of 660 degrees centigrade;
4. applying the molds 30 on the place where the two aluminum tubular members 10 are joined together so as to melt the two aluminum tubular members 10 together.

As the melting point of iron is 1538 degrees centigrade which is higher than that (660 degrees centigrade) of aluminum and the temperature of the molds 30 is 660 degrees centigrade, the iron ring member 20 will not be melted at the time when the two aluminum tubular members 10 are welded together thereby preventing the aluminum tubular members 10 from being deformed.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A method of joining two aluminum tubular members comprising steps of:

inserting a iron ring member into a first aluminum tubular member, with part of the iron ring member extending out of the first aluminum tubular member;

put a second aluminum tubular member on to the part of the iron ring member extending out of the aluminum tubular member;

heating a pair of molds having a less width than the iron ring member to a temperature of 660 degrees centigrade; and applying the molds on the place where the two aluminum tubular members are joined together so as to melt the two aluminum tubular members together.

* * * * *